(12) United States Patent
Dölz

(10) Patent No.: US 11,946,778 B2
(45) Date of Patent: Apr. 2, 2024

(54) RETAINING DEVICE FOR A ROTARY ENCODER

(71) Applicant: Siemens Aktiengesellschaft, Munich (DE)

(72) Inventor: Volker Dölz, Bad Neustadt (DE)

(73) Assignee: Siemens Aktiengesellschaft, Munich (DE)

( * ) Notice: Subject to any disclaimer, the term of this patent is extended or adjusted under 35 U.S.C. 154(b) by 285 days.

(21) Appl. No.: 17/435,956

(22) PCT Filed: Feb. 10, 2020

(86) PCT No.: PCT/EP2020/053319
§ 371 (c)(1),
(2) Date: Sep. 2, 2021

(87) PCT Pub. No.: WO2020/177985
PCT Pub. Date: Sep. 10, 2020

(65) Prior Publication Data
US 2022/0146285 A1    May 12, 2022

(30) Foreign Application Priority Data
Mar. 6, 2019 (EP) .................... 19161010

(51) Int. Cl.
*H02K 11/21* (2016.01)
*G01D 5/244* (2006.01)
(Continued)

(52) U.S. Cl.
CPC ..... *G01D 5/24442* (2013.01); *H02K 11/0141* (2020.08); *H02K 11/215* (2016.01);
(Continued)

(58) Field of Classification Search
CPC ...... H02K 11/215; H02K 11/40; H02K 7/083; H02K 11/0141; G01D 5/24442
See application file for complete search history.

(56) References Cited

U.S. PATENT DOCUMENTS

2006/0107760 A1    5/2006   Rhodes et al.
2008/0238267 A1*  10/2008   Scharrer ............... H02K 11/22
                                                      310/68 B
(Continued)

FOREIGN PATENT DOCUMENTS

CN    103344262 A    10/2013
CN    203550974 U    4/2014
(Continued)

OTHER PUBLICATIONS

PCT International Search Report and Written Opinion of International Searching Authority dated Apr. 5, 2020 corresponding to PCT International Application No. PCT/EP2020/053319 filed Oct. 2, 2020.

*Primary Examiner* — Leda T Pham
(74) *Attorney, Agent, or Firm* — Henry M. Feiereisen LLC

(57) ABSTRACT

A retaining device for coupling an encoder unit of a rotary encoder to an electric machine includes an end shield having a guide groove for receiving an encoder module of the encoder unit, and a retaining ring including a first coupling element for mechanically coupling the retaining ring to the end shield, with the first coupling element being embodied as a hole. A fastening screw is received in the hole to mechanically fasten the retaining ring to the end shield. A shielding element is integrally formed on the retaining ring for shielding against an external interference field.

16 Claims, 3 Drawing Sheets

(51) Int. Cl.
  *H02K 11/01*   (2016.01)
  *H02K 11/215*  (2016.01)
  *H02K 11/40*   (2016.01)
  *G01D 5/347*       (2006.01)
  *H02K 11/22*       (2016.01)

(52) U.S. Cl.
  CPC ......... *H02K 11/40* (2016.01); *G01D 5/34738* (2013.01); *H02K 11/22* (2016.01); *H02K 2211/03* (2013.01)

(56) References Cited

U.S. PATENT DOCUMENTS

| | | | |
|---|---|---|---|
| 2012/0187942 A1 | 7/2012 | Lee | |
| 2014/0263988 A1 | 9/2014 | Kirk et al. | |
| 2018/0375405 A1* | 12/2018 | Saito | G01D 5/24433 |
| 2019/0028001 A1* | 1/2019 | Forthaus | H02K 11/215 |

FOREIGN PATENT DOCUMENTS

| CN | 203933328 U | 11/2014 |
| CN | 204902853 U | 12/2015 |
| DE | 10 2005 039 081 A1 | 2/2007 |
| DE | 102008022369 A1 | 11/2009 |
| WO | WO 2010/072498 A1 | 7/2010 |

\* cited by examiner

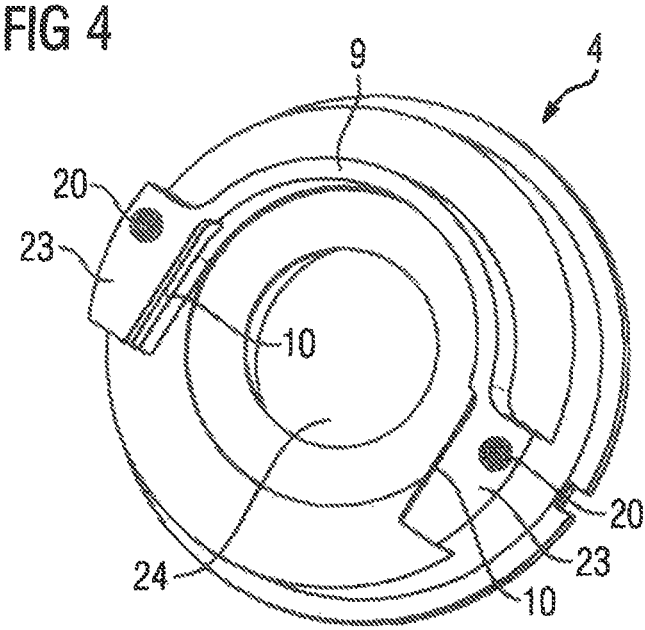
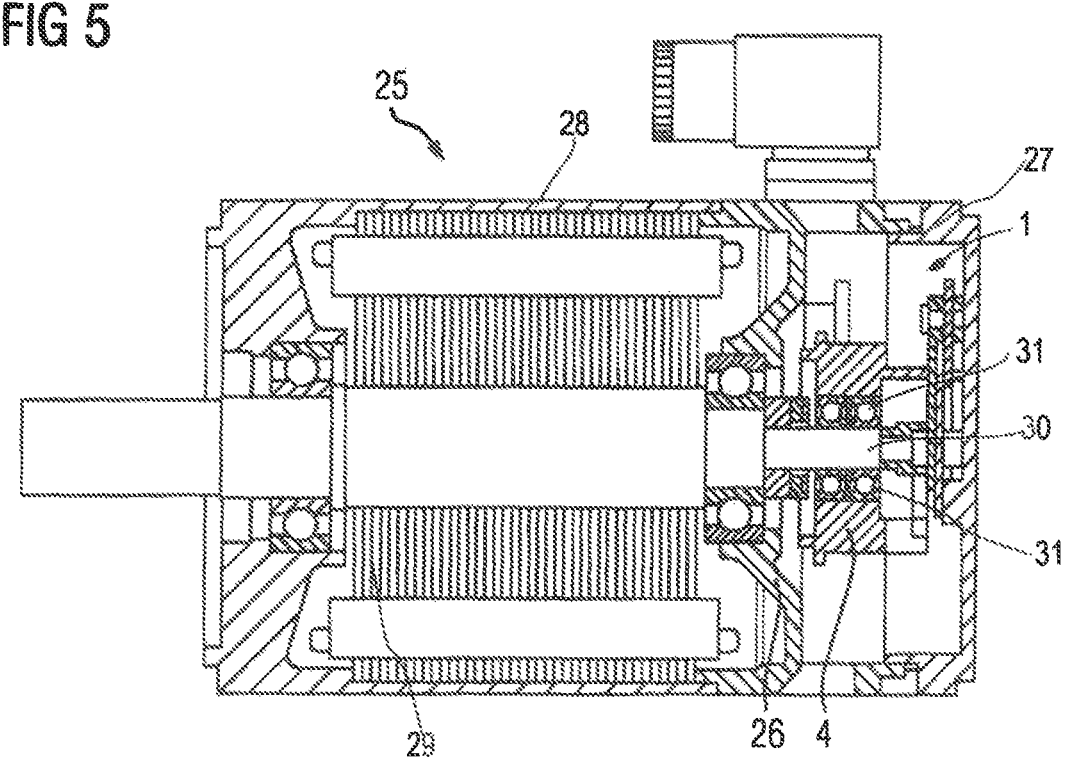

RETAINING DEVICE FOR A ROTARY ENCODER

CROSS-REFERENCES TO RELATED APPLICATIONS

This application is the U.S. National Stage of International Application No. PCT/EP2020/053319, filed Feb. 10, 2020, which designated the United States and has been published as International Publication No. WO 2020/177985 and which claims the priority of European Patent Application, Serial No. 19161010.4, filed Mar. 6, 2019, pursuant to 35 U.S.C. 119(a)-(d).

BACKGROUND OF THE INVENTION

The invention relates to a retaining device for coupling an encoder unit of a rotary encoder to an electric machine.

The invention further relates to a rotary encoder having such a retaining device, an electric machine having such a retaining device and also a method for mounting a rotary encoder, in particular a modular rotary encoder, by means of such a retaining device.

Such rotary encoders are generally optical rotary encoders that are used to control the rotational speed of electric motors. The most common are rotary encoders that are commercially available as finished products and can be installed and said rotary encoders generally include a bearing arrangement, a code disk and also an electronic unit that is illuminated. In the case of so-called multitum encoders, the number of revolutions is also counted in addition to the angular position. This occurs either mechanically via a transmission or magnetically via a so-called Wiegand sensor. Such encoders are frequently among the most expensive components of an electric motor.

WO 2010/072498 A1 relates to a method for mounting a modular rotary encoder on the object that is to be measured in which the modular rotary encoder comprises a code disk and an electric switching unit and in which the code disk is mounted on a rotary axis. The method comprises the steps: arranging the code disk on the rotary axis, setting the code disk along the rotary axis in order to ensure that the distance from the object to be measured corresponds to a predetermined value and fastening the electric switching unit to the object that is to be measured.

US 2014/263988 A1 relates to a rotary encoder having a freely suspended, flexible sensor carrier that makes the conventional bearing arrangement and the housing of a rotary encoder superfluous. A socket is attached in a rotatably-fixed manner to a shaft and the rotation of said shaft is to be measured. An encoder disk is axially connected to the socket. A sensor is held by a sensor carrier aligned above the encoder disk. The sensor can be connected directly to the sensor carrier or to a circuit board that is connected to the sensor carrier. A shaft orienting section of the sensor carrier surrounds the shaft and multiple stabilizing arms hold the sensor carrier in place as a result the sensor is held in the correct orientation.

US 2008/238267 A1 discloses an encoder arrangement of a direct current motor having an encoder housing, an encoder disk, a circuit board that is arranged perpendicular to a motor shaft, said circuit board having an optical sensor that surrounds the encoder disk in a U-shaped manner, and a connecting plug that is aligned in parallel with respect to the motor shaft. The encoder housing includes an encoder housing ring and an encoder housing cover. The encoder housing ring is provided with a radial recess that is arranged in the region of the connecting plug. The optical sensor is arranged on the circuit board on the side of the connecting plug and is provided with a receiving slot for the encoder disk and said receiving slot is open toward the motor shaft on which the encoder disk is mounted.

DE 10 2005 039081 A1 relates to a sensor head module for a rotary encoder that is constructed in a modular manner and comprises at least the sensor head module and a shaft flange module, which can be selected from a plurality of shaft flange modules for different shaft diameters and which can be connected to the sensor head module, having a sensor in order to detect an encoder signal in a state in which the rotary encoder is connected to the shaft flange module and said encoder signal is provided to the sensor by a signal source of the shaft flange module and represents a measurement for a rotation of a measuring shaft, and having a mechanical interface which is embodied in order to be able to be connected to all the accordingly embodied mechanical interfaces of the plurality of shaft flange modules in each case in such a manner that in the connected state the sensor captures a predetermined relative position with respect to the signal source.

The object of the invention is to render possible a simple, cost-effective and secure mounting of an in particular modular rotary encoder and simultaneously to render possible the reliable operation of said rotary encoder.

SUMMARY OF THE INVENTION

This object is achieved by a retaining device as set forth hereinafter.

As set forth hereinafter, the object is further achieved by a rotary encoder having such a retaining device, an electric machine having such a retaining device and also by a method for mounting a rotary encoder, in particular a modular rotary encoder, by means of such a retaining device.

The invention is based on the knowledge that a so-called kit encoder can also be used in a cost-effective manner in lieu of a rotary encoder that can be installed as a finished product and said kit encoder can be used as a modular rotary encoder. In this case the required mounting then plays a considerable role, wherein in accordance with the invention the mounting is achieved in a surprisingly simple manner by virtue of the fact that the retaining device is essentially formed from a retaining ring and an end shield, wherein the retaining ring has first coupling elements for mechanically coupling the retaining ring to the end shield of the rotary encoder and wherein the end shield has guide grooves for receiving an encoder module of the encoder unit. As a consequence, it is possible for the encoder module to be securely positioned in the encoder unit and to be mechanically coupled by means of the retaining ring to the end shield of the rotary encoder.

In this case, the encoder module is not directly screwed onto the end shield, said encoder module is only clamped and pressed against the end shield via the retaining ring. The encoder bearing arrangement includes the end shield, which acts as an encoder bearing housing, an encoder bearing shaft having for example two ball bearings and one engagement spring and also one coupling half via which the complete unit having an encoder and a circuit board is assembled on the motor. In this case, the encoder unit is produced separately and only then assembled on the motor. The engagement spring is used so as to engage the two ball bearings. The outer rings of the two ball bearings are displaced outwards against one another by the engagement spring and play is thus prevented and a specific tension is achieved. The mounting sequence of the encoder bearing arrangement is as follows: joining the first ball bearing of the encoder bearing arrangement until stopping on the shaft collar, placing the stop spring, joining the second ball bearing flush with respect to the shaft shoulder, sliding the encoder bearing runner into the encoder bearing housing and adhering the ball bearing outer ring to the encoder bearing housing.

Advantageous embodiments of the invention are included in the dependent claims.

A simple and secure mechanical coupling of the modular individual components, the retaining ring and the end shield, is achieved by virtue of the fact that the first coupling elements that are provided in the retaining ring as holes are embodied so as to receive first fastening screws in order to mechanically fasten the retaining ring to the end shield.

Both a mechanical as well as an electrical coupling of the encoder unit to a required circuit board can be achieved in a simple manner by virtue of the fact that the retaining ring has two coupling elements for mechanically coupling the retaining ring to a circuit board of the encoder unit.

The second coupling elements that are provided in the retaining ring are preferably embodied for this purpose as threaded holes for receiving second fastening screws, wherein the second fastening screws are used both as a mechanical fastening of the circuit board on the retaining ring as well as an electrical ground connection of the circuit board.

A cost-effective shielding against external interference fields, in particular with respect to a sensor that is arranged on the encoder unit, in particular a Wiegand sensor, is achieved by virtue of the fact that at least one shielding element for shielding against external interference fields is integrally formed on the retaining ring, in particular so as to shield against external interference fields that act upon a Wiegand sensor that is arranged on the encoder unit.

The shielding element is advantageously embodied as segment-shaped tabs or as a closed pot.

An effective protection against contaminants and environmental influences for the rotary encoder can be ensured by virtue of the fact that the end shield has a dust protection wall that is embodied in particular in a semicircular manner so as to protect a code disk that is arranged in the end shield.

The basic components of a modular rotary encoder in accordance with the invention consequently comprise a rotary encoder module, a code disk, a circuit board and also the retaining device that connects these components.

A secure positioning of the encoder module in the end shield is achieved in this case in a simple manner by virtue of the fact that the encoder module has at least two guide tabs that are arranged in particular on the upper end of the encoder module, wherein the guide tabs are provided so as to cooperate with the guide grooves that are provided in the end shield.

The method in accordance with the invention for mounting a rotary encoder, in particular a modular rotary encoder, by means of a retaining device comprises the following steps:
constructing the encoder bearing arrangement from an end shield, an encoder bearing shaft having in particular two ball bearings, an engagement spring and a coupling half,
pressing the code disk onto the encoder bearing shaft,
sliding the encoder module in, wherein the tabs are used as a guiding arrangement in the grooves of the end shield,
inserting the encoder module into the centering shoulder that is formed by an opening in the end shield,
placing the retaining ring onto the end shield,
mounting the retaining ring on the end shield by means of the first fastening screws,
mounting the circuit board including the connecting line on the retaining ring by means of the second fastening screws and
mounting the complete encoder unit on the electric machine.

BRIEF DESCRIPTION OF THE DRAWING

The invention is further described and explained below with reference to the exemplary embodiments that are illustrated in the figures.

In the drawings:

FIG. 4 shows an end shield for the modular rotary encoder that is illustrated in FIG. 1 and FIG. 5 shows a lateral section through an electric machine having a modular rotary encoder.

DETAILED DESCRIPTION OF PREFERRED EMBODIMENTS

Figure 1:
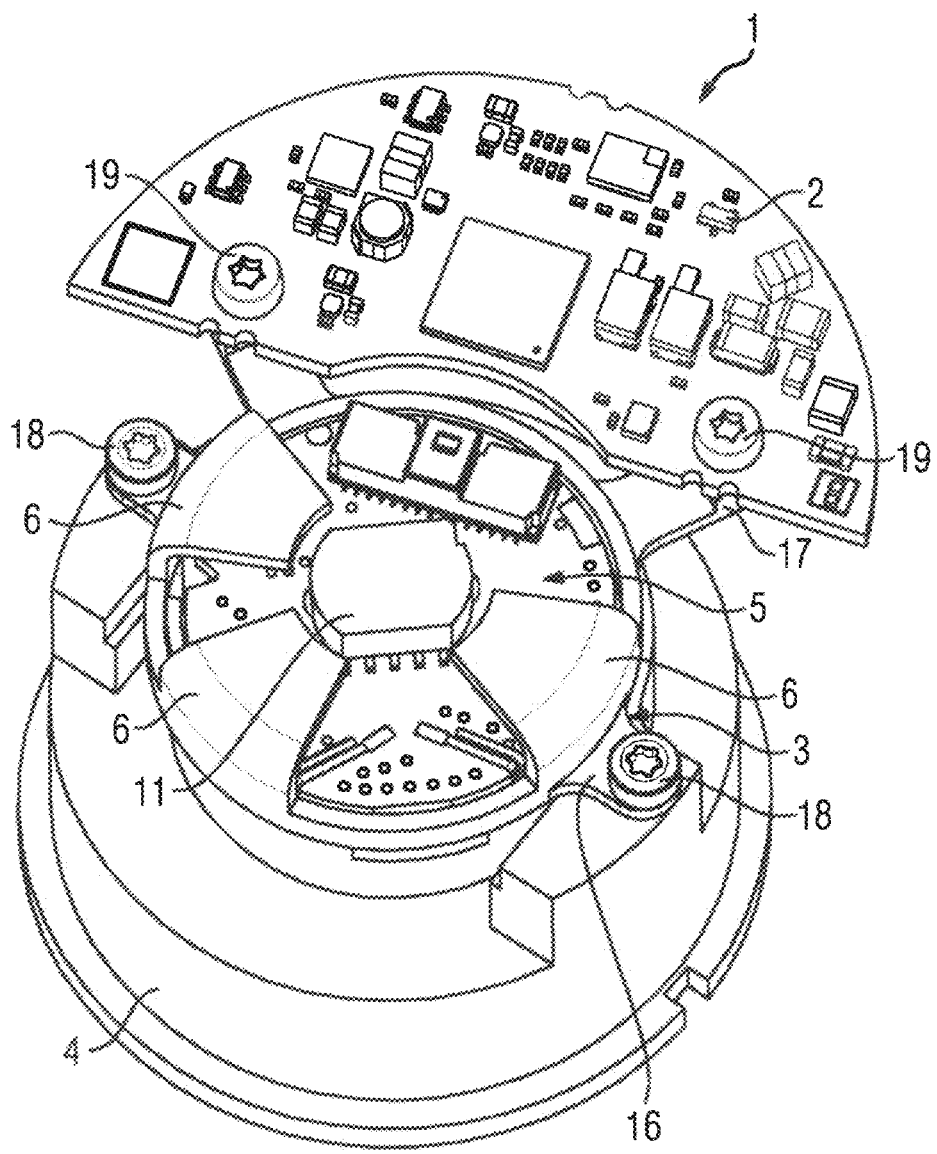
FIG. 1 shows a modular rotary encoder having a retaining device that is formed essentially from a retaining ring and an end shield.

FIG. 1 illustrates a modular rotary encoder 1 having a retaining device that is formed from a retaining ring 3 and an end shield 4. The retaining ring 3 is mechanically coupled to the end shield 4 mechanically via first fastening screws 18 and said retaining ring is then further illustrated and explained in conjunction with FIG. 3. The retaining ring 3 essentially includes a circular annular element 21 (cf. FIG. 3) and shielding tabs 6 are arranged on said annular element. Furthermore first coupling elements 16 are provided on the annular element 21 of the retaining ring 3 and said first coupling elements have fastening holes 7. These first coupling elements 16 are integrally formed on the annular element 21 in a lug-shaped manner. The fastening holes 7 (cf. FIG. 3) are used to feed through the first fastening screws 18 for coupling the retaining ring 3 in a mechanical manner to the end shield 4.

The rotary encoder 1 that is illustrated in FIG. 1 furthermore contains an encoder unit 5 that is mechanically mounted in the end shield 4 (cf. FIG. 4) and is additionally mechanically held by the retaining ring 3. Furthermore, second coupling elements 17 are arranged on the retaining ring 3 and threaded holes 8 are provided in said coupling elements so as to receive a circuit board 2, wherein the circuit board 2 is mechanically fastened by means of second fastening screws 19 in the first threaded holes 8 of the retaining ring 3 (cf. FIG. 3). The encoder unit 5 supports a so-called Wiegand sensor 11 that is visible in the upper region, wherein a shielding of the Wiegand sensor 11 is ensured by means of the shielding tabs that are integrally formed on the retaining ring 3.

The distinctive feature of the modular rotary encoder that is illustrated in FIG. 1 resides in the fact that the rotary encoder 1 can be assembled in a simple and reliable manner from few modular components, wherein owing to the specific modular construction the modular rotary encoder 1 renders possible a simple mounting and also a reliable operation of the rotary encoder 1. One distinctive feature of the modular rotary encoder resides in the fact that tabs 14 are arranged on the encoder unit 5 in the upper region on opposite lying sides (cf. FIG. 2) and said tabs cooperate with corresponding guide grooves 10 (cf. FIG. 4) of the end shield 4 and thereby ensure a stable bearing arrangement of the encoder unit 5 in the end shield 4. The circuit board 2 that is required for a coordinate conversion is also mechanically fastened in a simple and secure manner to the retaining ring 3 of the rotary encoder 1 in the case of the rotary encoder 1 that is illustrated in FIG. 1, wherein moreover an electrical ground connection is also insured via the screw connections 19. Additional ground lines that are susceptible to interference can therefore be omitted.

The distinctive feature of the rotary encoder 1 that is illustrated in FIG. 1 consequently resides in the fact that in contrast to previous solutions the assembly of the rotary encoder 1 is to be performed in a particularly simple manner. The specific design of the end shield 4 (cf. FIG. 2) having the lateral grooves 10 therefore allows the encoder unit 5, which is also referred to as a so-called C module, to slide particularly easily into the correct position wherein an incorrect mounting is thereby practically impossible. The end shield 4 furthermore has a dust protection wall 9 that lies on the side opposite the insertion (cf. FIG. 4) and said dust protection wall protects the code disk 12 (cf. FIG. 2) of the encoder unit 5 against contamination. The retaining ring 3 also simultaneously integrates multiple functions, namely said retaining ring on the one hand clamps the encoder unit 5 and holds the circuit board 2 and further shields the Wiegand sensor 11 by means of the shielding tabs 6. It is consequently possible owing to the dust protection wall 9 of the end shield 4 to omit a separate dust protection cap that would otherwise be required. As already stated, the circuit board 2 is directly grounded via the screwing arrangement to the retaining ring 3. It is possible by producing the retaining ring 3 from a conductive material, in particular from steel, for a separate grounding bracket to no longer be necessary as would be required in the case of dust protection caps or fastening apparatuses that are embodied previously from plastic.

As already stated, the retaining ring consequently integrates the functions of "clamping the encoder, holding and grounding the circuit board and also shielding the Wiegand sensor". Altogether, this consequently reduces assembly costs and also leads to an increase in quality during assembly as well as during operation and furthermore also leads to it being easy to repair during maintenance work.

The mounting of the modular rotary encoder on a motor end shield 26 of an electric machine 25 (cf. FIG. 5) is consequently performed essentially in the following steps:
  mounting the encoder bearing arrangement: constructing the encoder bearing arrangement comprised of an end shield 4, an encoder bearing shaft 30 having two ball bearings 31 and an engagement spring and also a coupling half,
  pressing the code disk: for this purpose the code disk 12 is pressed onto the encoder bearing shaft 30 of the electric machine 25,
  sliding the encoder module 13 in: in this case the tabs 14 are used as a guiding arrangement in the grooves 10 of the end shield 4,
  inserting the encoder module 13 into the centering shoulder that is formed by an opening 24 in the end shield 4,
  placing the retaining ring 3 onto the end shield 4 and mounting the retaining ring 3 on the end shield 4 by means of the first fastening screws,
  placing the circuit board 2 on the retaining ring 3 and fastening the circuit board 2 to the retaining ring 3 by means of the second fastening screws,
  mounting the circuit board including the connecting line on the retaining ring by means of the fastening screws,
  mounting the complete encoder unit 1 on the electric machine 25.

Figure 2:
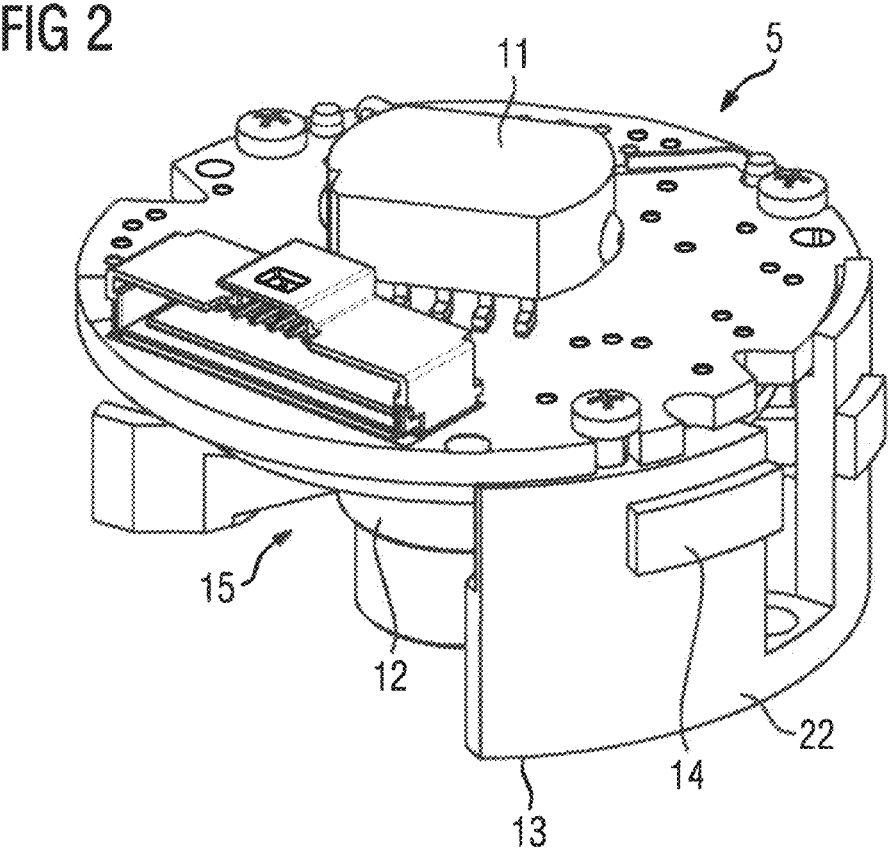
FIG. 2 shows an encoder module for the modular rotary encoder that is illustrated in FIG. 1.

FIG. 2 illustrates an encoder module 13 for the modular rotary encoder 1 that is illustrated in FIG. 1. FIG. 2 again illustrates which components are essentially comprised in the encoder unit 5. The encoder unit 5 essentially comprises an opening 15 for the encoder module 13 having the code disk 12. The encoder unit 5 has a cylindrical sidewall 22 that is provided with tabs 14 on in each case two opposite lying sides. These tabs 14 correspond to guide grooves 10 as they are provided in FIG. 4 on the end shield 4. The tabs 14 are consequently used to guide and orient the angular position. Furthermore, the Wiegand sensor 11, as has already been explained in conjunction with FIG. 1, is also apparent in FIG. 2. With regard to the operating principle and the cooperation of the encoder unit 5 in relation to the modular rotary encoder 1 reference is made to the statements with regard to FIG. 1 and also the remaining figures.

Figure 3:
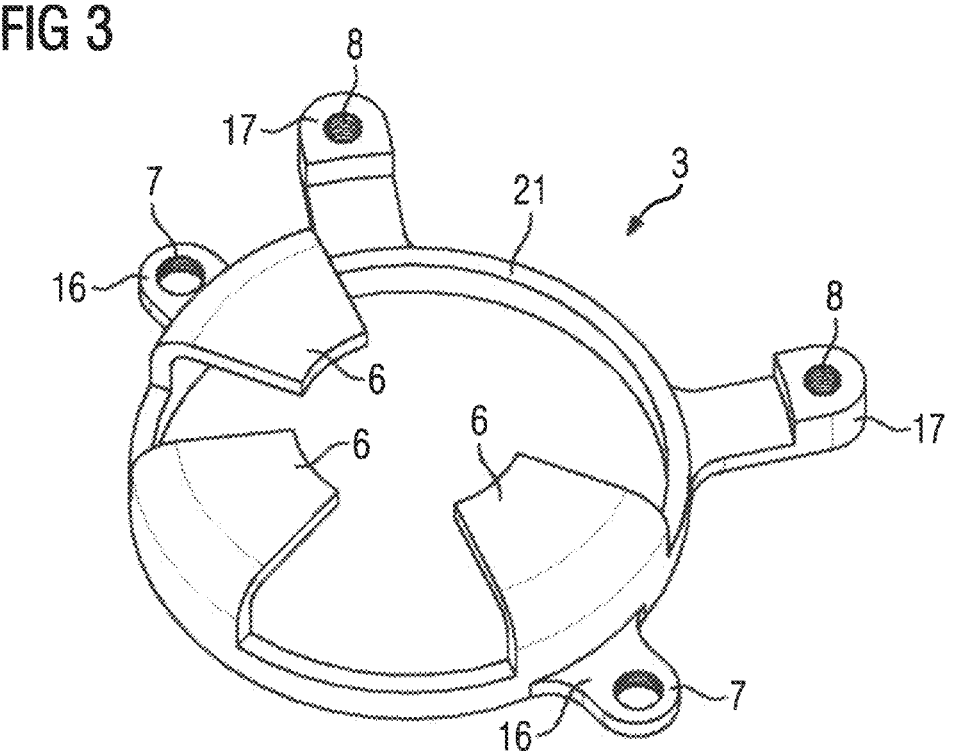
FIG. 3 shows a retaining ring for the modular rotary encoder that is illustrated in FIG. 1.

FIG. 3 illustrates a retaining ring 3 for the modular rotary encoder 1 that is illustrated in FIG. 1. The retaining ring 3 essentially includes an annular element 21 and shielding tabs 6 are integrally formed on said annular element. Furthermore, the retaining ring 3 has first coupling elements 16 and also second coupling elements 17, the first coupling elements 16 are embodied as lugs 16 that are integrally formed on the annular element 21 and fastening holes 7 are integrated into said lugs so as to receive first fastening screws for the end shield (cf. FIG. 1). The second coupling elements 17 are embodied as second lugs 17 that are integrally formed on the annular element 21 and said second lugs have first threaded holes 8 for receiving second fastening screws 19 for the circuit board (cf. FIG. 1).

The second lug elements 17 are embodied further spaced with respect to the first lug elements 16 from the annular element 21 and the thickness of these lug elements 17 is embodied as thicker in the region of the threaded holes 8 in order to ensure a secure seat of the fastening screws 19 for the circuit board 2.

Finally, FIG. 4 illustrates an end shield 4 for the modular rotary encoder 1 that is illustrated in FIG. 1. The distinctive feature of the end shield 4 that is illustrated in FIG. 4 resides in the fact that a semicircular band element 23 is provided on the end shield 4 and said band element has in each case guide grooves 10 on opposite lying sides and said guide grooves are provided so as to receive the guide tabs 14 that are arranged on the encoder unit 5. The front semicircle of the end shield 4 between the wall elements 23 is embodied as open in a first semicircular region with the result that it is rendered possible to insert the encoder unit 5 while the opposite lying region of the end shield 4 supports a dust protection wall 9 that is used as dust protection for the encoder module or the entire encoder unit 5 and in particular the code disk 12.

FIG. 5 illustrates a lateral section through an electric machine 25 having a modular rotary encoder 1. The electric machine 25 includes a housing 27. A stator 28 is arranged in the housing 27. A rotor 29 is furthermore mounted in the housing 27 and in rotative engagement with a shaft 30. FIG. 5 serves in particular to clarify where and how the modular rotary encoder 1 is coupled to a motor end shield 26 of the electric machine 25 via the end shield 4 of the rotary encoder 1.

In summary, the invention consequently relates to a retaining device 3, 4 for coupling an encoder unit 5 of an in particular modular rotary encoder 1 to a motor end shield 26 of an electric machine 25. For a simple and secure mounting in particular of a modular rotary encoder and also for its reliable operation, it is proposed that the retaining device 3, 4 is essentially formed from a retaining ring 3 and an end shield 4 of the rotary encoder 1, wherein the retaining ring 3 has first coupling elements 16 for mechanically coupling the retaining ring 3 to the end shield 4 and wherein the end shield 4 has guide grooves 10 for receiving an encoder module 13 of the encoder unit 5, wherein the first coupling elements 16 that are provided in the retaining ring 3 are embodied as holes 7 for receiving first fastening screws 18 for mechanically fastening the retaining ring 3 to the end shield 4 and wherein at least one shielding element 8 for shielding against external interference fields is integrally formed on the retaining ring 3. The second coupling element 17 is embodied as a threaded hole 8 for receiving and grounding the circuit board 2 via the second fastening screws 19.

The invention claimed is:

1. A retaining device for coupling an encoder unit of a rotary encoder to an electric machine, said retaining device comprising:
   an end shield comprising a semicircular band element having opposing guide grooves oriented perpendicular to an encoder bearing shaft for receiving an encoder module of the encoder unit, said encoder module having guide tabs constructed to engage in the opposing guide grooves;
   a retaining ring including a first coupling element for mechanically coupling the retaining ring to the end shield and constructed to clamp the encoder module and press the encoder module against the end shield, said first coupling element being embodied as a hole;
   a first fastening screw received in the hole to mechanically fasten the retaining ring to the end shield; and
   a shielding element integrally formed on the retaining ring for shielding against an external interference field.

2. The retaining device of claim 1, wherein the retaining ring includes a second coupling element for mechanically coupling the retaining ring to a circuit board of the encoder unit.

3. The retaining device of claim 2, wherein the retaining ring is made of conductive material to enable a grounding of the circuit board without installation of a separate grounding bracket, when the circuit board is directly screwed to the retaining ring.

4. The retaining device of claim 2, wherein the second coupling element is embodied as a threaded hole, and further comprising a second fastening screw received in the threaded hole for effecting a mechanical fastening of the circuit board on the retaining ring and an electrical ground connection of the circuit board.

5. The retaining device of claim 1, wherein the shielding element is configured to shield a Wiegand sensor on the encoder unit against the external interference field.

6. The retaining device of claim 1, wherein the shielding element is embodied as a segment-shaped tab.

7. The retaining device of claim 1, wherein the semicircular band element forms a dust protection wall configured to protect a code disk arranged in the end shield.

8. An electric machine, comprising a retaining device as set forth in claim 1, or a rotary encoder including said retaining device.

9. A rotary encoder, comprising a retaining device which includes an end shield having opposing guide grooves oriented perpendicular to an encoder bearing shaft for receiving a rotary encoder module having guide tabs constructed to engage in the opposing guide grooves, a retaining ring including a first coupling element for mechanically coupling the retaining ring to the end shield and constructed to clamp the encoder module and press the rotary encoder module against the end shield, said first coupling element being embodied as a hole, a first fastening screw received in the hole to mechanically fasten the retaining ring to the end shield, and a shielding element integrally formed on the retaining ring for shielding against an external interference field.

10. The rotary encoder of claim 9, constructed in the form of a modular rotary encoder which includes a code disk arranged in the end shield, and a circuit board mechanically coupled to the retaining ring by a second coupling element of the retaining ring.

11. The rotary encoder of claim 10, wherein the second coupling element is embodied as a threaded hole, said retaining device including a second fastening screw received in the threaded hole for effecting a mechanical fastening of the circuit board on the retaining ring and an electrical ground connection of the circuit board.

12. The rotary encoder of claim 10, further comprising a Wiegand sensor arranged on the rotary encoder module and shielded by the shielding element against the external interference field.

13. The rotary encoder of claim 12, wherein the semicircular band element forms a dust protection wall configured to protect the code disk.

14. The rotary encoder of claim 10, wherein the guide tabs are arranged on an upper end of the encoder module.

15. The rotary encoder of claim 9, wherein the shielding element is embodied as a segment-shaped tab.

16. A method for mounting a rotary encoder, said method comprising:
   pressing a code disk of the rotary encoder onto an encoder bearing shaft of an encoder bearing arrangement;
   slidingly inserting in a direction perpendicular to the encoder bearing shaft an encoder module by guiding tabs of the encoder module in guide grooves oriented perpendicular to the encoder bearing shaft of an end shield of a retaining device;
   inserting the encoder module into a centering shoulder formed by an opening in the end shield
   placing a retaining ring of the retaining device onto the end shield;
   mounting the retaining ring on the end shield via a first fastening screw;
   mounting a circuit board including a connecting line on the retaining ring via a second fastening screw to produce an encoder unit; and
   mounting the encoder unit on an electric machine.

* * * * *